(12) United States Patent
Callon

(10) Patent No.: US 6,256,295 B1
(45) Date of Patent: Jul. 3, 2001

(54) METHOD AND APPARATUS FOR DETERMINING MULTIPLE MINIMALLY-OVERLAPPING PATHS BETWEEN NODES IN A NETWORK

(75) Inventor: Ross W. Callon, Westford, MA (US)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 08/937,450

(22) Filed: Sep. 25, 1997

(51) Int. Cl.$^7$ ............................ H04L 12/58; G06F 15/173
(52) U.S. Cl. ........................ 370/254; 370/396; 370/256; 709/238
(58) Field of Search ................................. 370/238, 255, 370/228, 254, 351, 400, 401, 396, 397, 395, 709, 340; 709/238, 239, 241; 340/825.01, 827, 370; 320/256, 235, 236, 237, 209

(56) References Cited

U.S. PATENT DOCUMENTS

| | | | | |
|---|---|---|---|---|
| 4,736,363 | * | 4/1988 | Aubin et al. | 370/351 |
| 5,115,495 | * | 5/1992 | Tsuchiya et al. | 370/351 |
| 5,233,604 | * | 8/1993 | Ahmadi et al. | 370/400 |
| 5,251,205 | * | 10/1993 | Callon | 370/351 |
| 5,253,248 | * | 10/1993 | Dravida et al. | 370/400 |
| 5,577,030 | * | 11/1996 | Oki et al. | 370/351 |
| 5,649,108 | * | 7/1997 | Spiegel et al. | 370/400 |
| 5,699,347 | * | 12/1997 | Callon | 370/238 |
| 5,754,543 | * | 5/1998 | Seid | 370/256 |
| 5,825,772 | * | 10/1998 | Dobbins | 370/401 |
| 5,923,646 | * | 7/1999 | Mandhyan | 370/254 |
| 5,933,425 | * | 8/1999 | Iwata | 370/252 |
| 6,016,306 | * | 1/2000 | Le Boudec et al. | 370/235 |
| 6,044,075 | * | 3/2000 | Leboudec | 370/351 |

OTHER PUBLICATIONS

Ogier, Distributed Algorithms for computing Shortest Pairs of disjoint paths, IEEE, pp. 443–455, Aug. 1993.*
Torrieri, Algorithms for finding an optimal set of short disjoint paths in communication network, IEEE, pp. 11–15, 1991.*
Ishida, Multiple node disjoint paths protocol for VP in ATM networks, IEEE, pp. 91–97, Feb. 1997.*
Shaikh, Span Disjoint Paths for physical Diversity in networks, IEEE, pp. 127–133, Apr. 1995.*
Callon, Jeffords, Sandick, and Halpern, Issues and Approaches for Integrated PNNI, The ATM Forum Technical Committee, Apr. 15, 1996, Anchorage, Alaska.
Private Network–Network Interface Specification Version 1.0 (PNNI 1.0), The ATM Forum Technical Committee, af–pnni–0055.00, Mar. 1996.

* cited by examiner

Primary Examiner—Wellington Chin
Assistant Examiner—Steven Nguyen
(74) Attorney, Agent, or Firm—Blakely Sokoloff Taylor & Zafman LLP

(57) ABSTRACT

A system is provided for determining a plurality of minimally-overlapping paths between a source node and a destination node in a network. The system determines a first path between the source node and the destination node. Additionally, a second path between the source node and the destination node is determined. If the first path and the second path overlap, the system modifies at least one path to minimize the overlap of the paths. Both the first path and the second path contain a plurality of path elements in which the path elements including nodes and links between nodes such that a cost is assigned to both nodes and links. After the paths are identified, a first circuit is established between the source and destination nodes along the first path and a second circuit is established between the source and destination nodes along the second path.

42 Claims, 10 Drawing Sheets

METHOD AND APPARATUS FOR DETERMINING MULTIPLE MINIMALLY-OVERLAPPING PATHS BETWEEN NODES IN A NETWORK

FIELD OF THE INVENTION

The present invention relates generally to networks and more particularly to the calculation of paths between nodes in a network having a mesh topology.

BACKGROUND

In a network having a mesh topology, there may be multiple paths or "routes" between any two nodes of the network, wherein each path may include one or more intermediate nodes. Typically, a single "best" path between two nodes is calculated by a routing algorithm of a routing protocol such as Routing Information Protocol (RIP), Intermediate System-to-Intermediate System (IS-IS), Open Shortest Path First (OSPF), Private Network-to-Network Interface (PNNI), or Integrated PNNI (I-PNNI). Many routing protocols use a variation of the well-known Dijkstra algorithm to determine the best path between two network nodes.

For connection-oriented packet and cell switching, which may be implemented in Asynchronous Transfer Mode (ATM) networks, the best path calculated by the routing algorithm is used to define a dedicated path or "virtual circuit" (VC) for transferring information between the two nodes. As is well-known, ATM networks support both permanent virtual circuits (PVCs) and switched virtual circuits (SVCs), both of which are hereafter referred to generically as VCs.

Only a single VC is typically provided between any two nodes, but for some applications it may be desirable to provide multiple VCs for a particular source and destination pair of nodes. For example, a secondary VC may be used as a redundant connection should a primary VC fail or otherwise become unavailable. Multiple VCs may also be used to increase the amount of network traffic that may be exchanged between the source and destination nodes.

When a redundant VC is provided, it is desirable to provide a minimum amount of overlap between the redundant VC and the primary VC such that the possibility of a single point of failure for the redundant VC and the primary VC is reduced. If two non-overlapping paths are provided between a particular pair of nodes, any failure along one path will not cause the second path to fail. Therefore, a method for determining multiple minimally-overlapping paths between two nodes is needed.

SUMMARY OF THE INVENTION

Embodiments of the present invention provide a system for determining multiple minimally-overlapping paths between a source node and a destination node.

In a particular embodiment of the invention, a first path is determined between the source node and the destination node. Next, a second path is determined between the source node and the destination node. If the first path and the second path overlap, at least one path is modified to minimize the overlap between the first path and the second path.

In specific embodiments of the invention, both the first path and the second path contain multiple path elements. The path elements include nodes and links between nodes such that a cost is assigned to both nodes and links.

Another aspect of the invention provides for the establishment of a first circuit between the source and destination nodes along the first path and the establishment of a second circuit between the source and destination nodes along the second path.

Other features and advantages of the present invention will be apparent from the accompanying drawings and from the detailed description which follows below.

BRIEF DESCRIPTION OF THE DRAWINGS

Embodiments of the present invention are illustrated by way of example in the following drawings, in which like references indicate similar elements. The various embodiments shown in the drawings are provided for purposes of illustration only and are not intended to limit the scope of the invention.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, and circuits have not been described so as not to obscure the invention.

Methods and computations for determining multiple non-overlapping or minimally-overlapping paths are described. Paths determined by the described methods may be used to establish multiple virtual circuits between a source node and a destination node of a network, thereby allowing redundant virtual circuits and fast switch-over in the event of a failure along one of the paths. Thus, the paths are selected to minimize overlapping, and are not necessarily the minimum-cost paths between the source node and the destination node. In certain situations, the non-overlapping or minimally-overlapping paths may have a considerably higher cost than the minimum-cost path. However, the non-overlapping or minimally-overlapping paths provide redundancy and increased bandwidth between the source and destination nodes.

Figure 1:
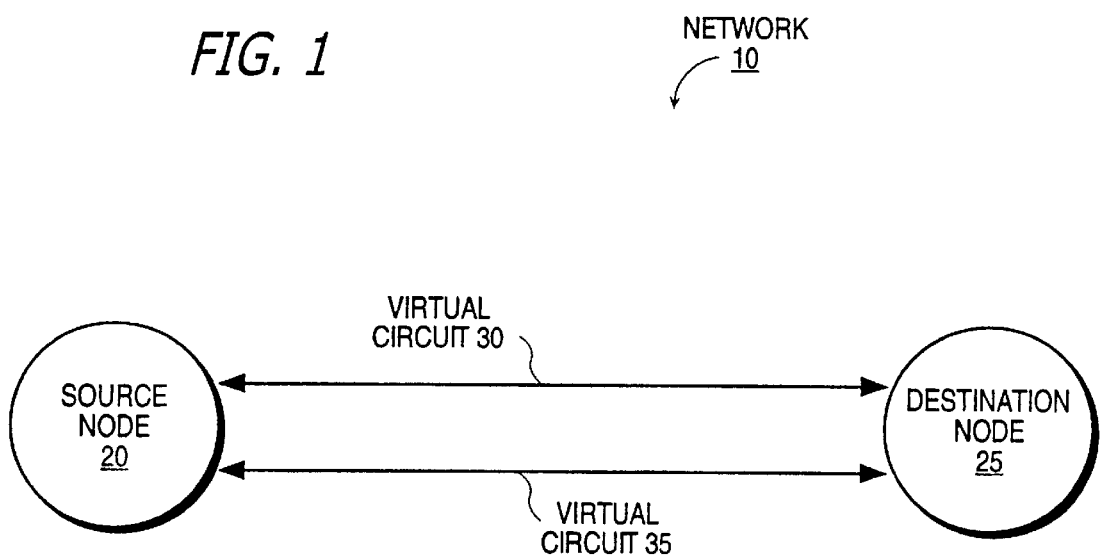
FIG. 1 shows an embodiment of a network having multiple virtual circuits defined between a source node and a destination node.

FIG. 1 illustrates an example network 10 having a source node 20 and second VC, a destination node 25 between which two virtual circuits (VCs) 30 and 35 are established. According to one embodiment of the invention, network 10 operates according to the asynchronous transfer mode (ATM) network protocol, and the source and destination nodes are routers. Alternatively, the source and destination nodes may be ATM switches. VCs 30 and 35 may be either switched virtual circuits (SVCs) or permanent virtual circuits (PVCs) and may comprise several additional network nodes such as routers or ATM switches.

In the embodiment of FIG. 1, all the nodes of the network utilize a link state or topology state routing protocol. According to one embodiment of the invention, the Private Network-to-Network Interface (PNNI) protocol is used, but alternative embodiments use Integrated PNNI (I-PNNI), Open Shortest Path First (OSPF), or Intermediate System-to-Intermediate System (IS-IS). Regardless, the routing protocol is modified to provide the ability to select multiple non-overlapping or minimally-overlapping paths between source and destination nodes as described below. A mechanism is provided to map data cells or packets to the selected paths such that one flow of data uses a first path and another flow of data uses a second path. For example, a particular SVC may be mapped to each of the non-overlapping or minimally-overlapping paths.

In another embodiment, the invention is implemented in a connectionless (or datagram) network such as a router network. The connectionless network may forward packets complying with any number of datagram network protocols, such as Internet Protocol (IP), Internetwork Packet Exchange (IPX), ISO Connectionless Network Protocol (CLNP), and similar protocols. In this embodiment, a mechanism is provided for mapping particular datagram packets onto particular paths. For example, where multiple packets are to be transmitted across multiple paths between a source node and a destination node, certain packets may be mapped onto a first path and other packets may be mapped onto a second path.

Figure 2:
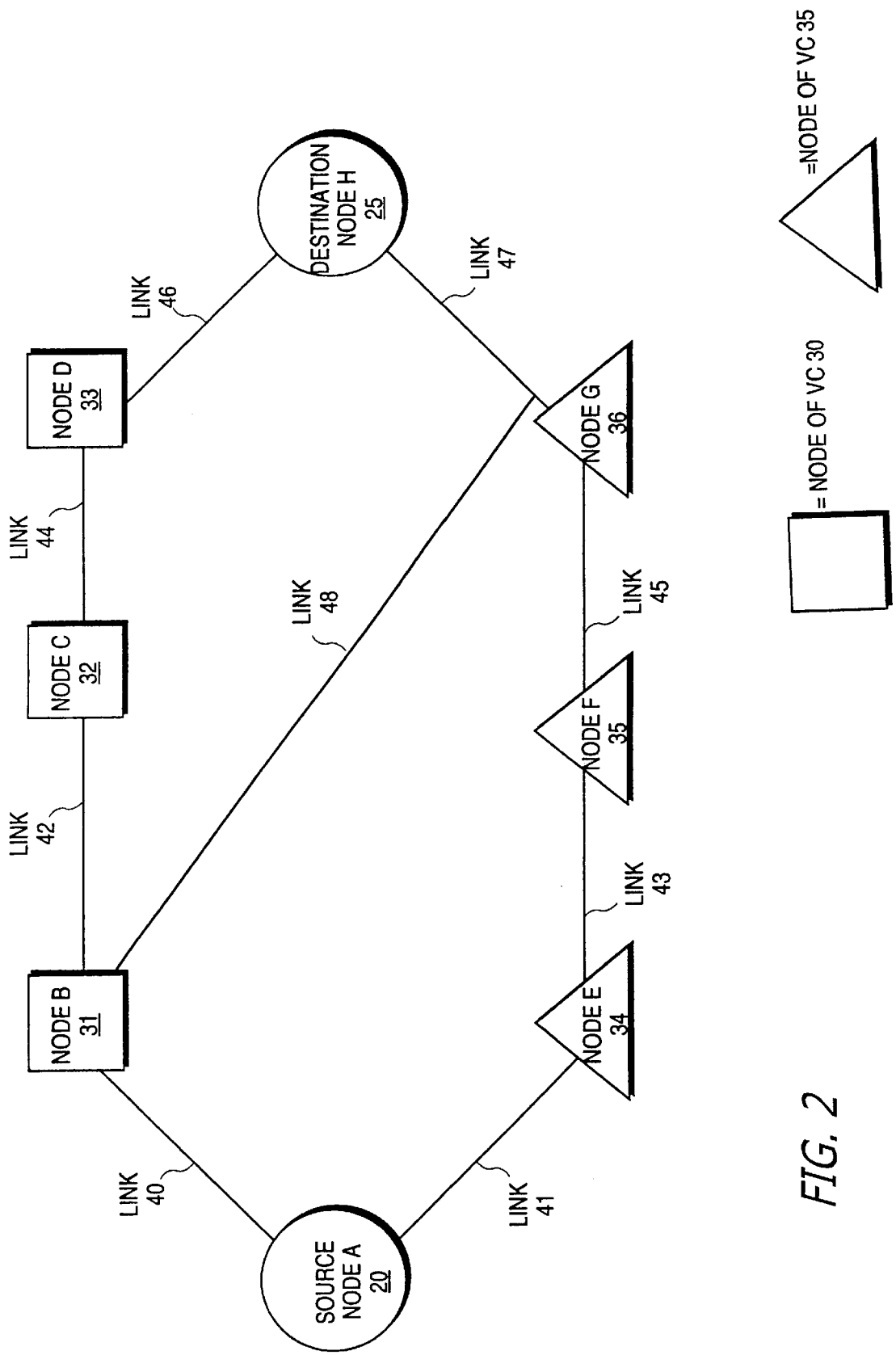
FIG. 2 shows the network of FIG. 1 in more detail.

FIG. 2 shows network 10 of FIG. 1 in more detail. Specifically, network 10 is shown as a mesh topology that includes a source node 20 (also designated as "A"), a destination node 25 (also designated as "H"), and several intermediate nodes 31–36 (also designated as "B," "C," "D," "E," "F," and "G," respectively), all of which are interconnected by network links 40–48. To differentiate between nodes that are included in VC 30 and nodes included in VC 35, the nodes of VC 30 are shown as squares, and the nodes of VC 35 are shown as triangles. Therefore, VC 30 is shown as including nodes 31, 32, and 33, and VC 35 is shown as including nodes 34, 35, and 36.

Each VC in FIG. 2 has been established along a path determined by a non-overlapping routing algorithm such as that described below. A path is expressed in terms of all nodes along the path, including the source and destination nodes. For example, the path of second VC 30 is expressed as [A,B,C,D, H], and the path of VC 35 is expressed as [A,E,F,G,H]. It is apparent that alternative paths may be found between the source node A and the destination node H. For example, a shortest path appears to be [A,B,G,H]. However, this shortest path would prohibit the establishment of two non-overlapping paths. Additional details regarding the establishment of non-overlapping paths are provided below.

According to known link state routing protocols, a cost is assigned to traverse each link in a path. The cost of each link in a path between a source node and a destination node is accumulated to determine the total cost of that path. Typical known route computation algorithms, such as the Dijkstra algorithm, determine the lowest cost path based on the total cost of the included links. Additionally, it may be desirable to associate a distinct cost with each node of a path. Thus, the nodes and links of a path will both be referred to generically as "path elements."

Figure 3:
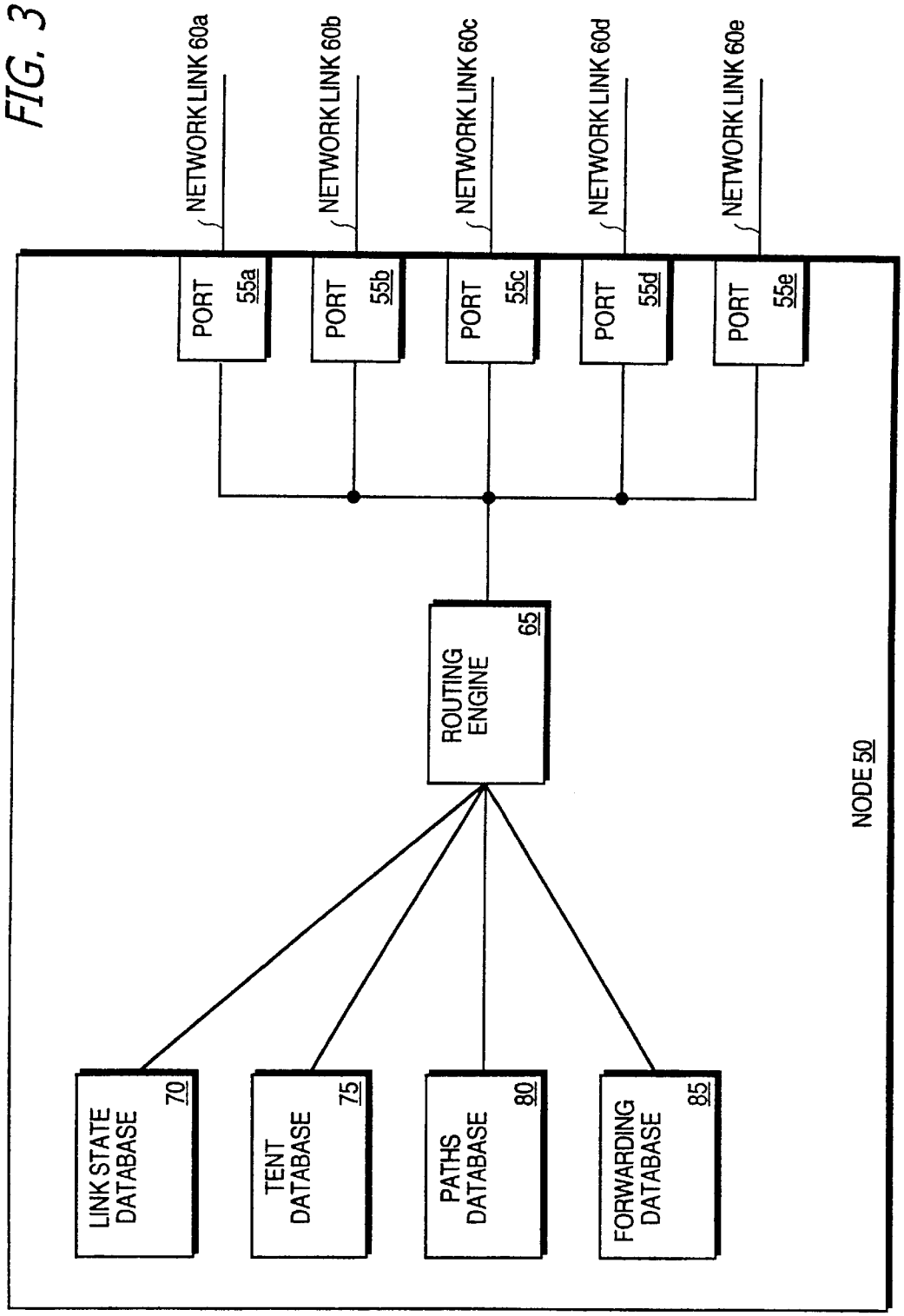
FIG. 3 shows an embodiment of a network node.

Prior to discussing the methods for determining multiple non-overlapping and minimally-overlapping paths, an exemplary network node 50 will be discussed with respect to FIG. 3. Node 50 may be, for example, a router or switch (such as an ATM switch) and includes multiple ports 55a–55e, each for coupling to a corresponding one of network links 60a–60e. Node 50 also includes a routing engine (or switching engine) 65 that performs routing or switching functions for exchanging data between ports 55a–55e. According to one embodiment, routing engine 65 includes a processor, memory, and associated software stored in memory.

Routing or switching engine 65 is coupled to a link state database 70, a tentative ("TENT") database 75, a PATHS database 80, and a forwarding database 85. As a router or switch, node 50 exchanges link state packets via its various ports with every other connected node of network 10, and the link state database 70 stores the link state packets received from all nodes in the network. Each node of network 10 generates its own link state packet that includes information regarding its neighbor nodes including the identity of each neighbor node and the cost associated with reaching each neighbor node. When node 50 has received link state packets from every node of network 10, node 50 will have a complete map of the topology of the network stored in link state database 70. Routing engine 65 may use the information stored in link state database 70 to determine paths between node 50 and any other node of the network.

The Dijkstra algorithm is a common routing algorithm for determining the best path between the computing source node and the desired destination node. TENT database 75 and PATHS database 80 are used by the Dijkstra-based algorithms to determine such a path. Forwarding database 85 stores the calculated best path and allows routing engine 65 to perform a simple lookup to determine the path for forwarding a packet to the destination node.

The Dijkstra algorithm generally comprises a series of "expanding" steps in which a node is placed in a path and its neighbor nodes are examined to determine which node should next be placed in a path. The Dijkstra algorithm terminates 1) when TENT database 75 is empty or 2) when the destination node has been placed in a path. PATHS database 80 stores information regarding the shortest paths from the source node to other nodes in the network. When the Dijkstra algorithm terminates, if TENT is empty (option 1 above), then PATHS database 80 contains the shortest path to every other reachable node in the network. Otherwise (option 2 above), the shortest path to the destination node and to any node closer to the source than the destination node has been computed. A path cannot be added to PATHS database 80 until it has been confirmed to be the shortest path to a particular node.

TENT database 75 stores information regarding tentative paths to other nodes in the network. A path is included in TENT database 75 if it is the shortest path located to a particular node up to this point in the Dijkstra computation, but has not yet been confirmed as the shortest possible path to the destination. Paths are moved from TENT database 75 to PATHS database 80 as each path in TENT is confirmed as the shortest path to a particular node. Typically, each entry in the TENT and PATHS databases includes the identification (ID) of the node, the path cost to the node, and the forwarding direction.

When performing the Dijkstra algorithm, the PATHS database is initialized to be empty and the TENT database is initialized to include each node T which is immediately adjacent to the initial node S. The associated path [S,T] and the associated cost is included in the TENT database for each node T. At each step of the Dijkstra algorithm, the node T in TENT which is closest to node S is moved from TENT to PATHS along with the associated path to T and the associated cost. If two or more nodes T are the same distance from node S, then any node T may be selected (e.g., randomly selected). For each node U which is adjacent node T, the path from node S to T to U is compared with any existing path to node U stored in the PATHS or TENT database. The cost of the new path from node S to node U equals the cost of the link from node S to node T, plus the cost, if any, to traverse node T, plus the cost of the link from node T to node U. If there is an existing path to node U in TENT and the existing path has a cost less than or equal to the new path, then the new path is ignored. However, if the cost of the new path is less than the cost of any existing path to node U in TENT (or if there is no existing path to node U in TENT), then the existing path to node U, if any, is removed from TENT and the new path is added to TENT.

If the first option is used, then the above procedure is repeated until the TENT database is empty. When TENT is empty, then the PATHS database is complete and contains the lowest cost path to every reachable node in the network. Any nodes to which no path has been found are unreachable from node S. If the second option is used, then the procedure stops after finding the shortest path to the destination node and to any node closer to the source than the destination node.

Figure 4A:
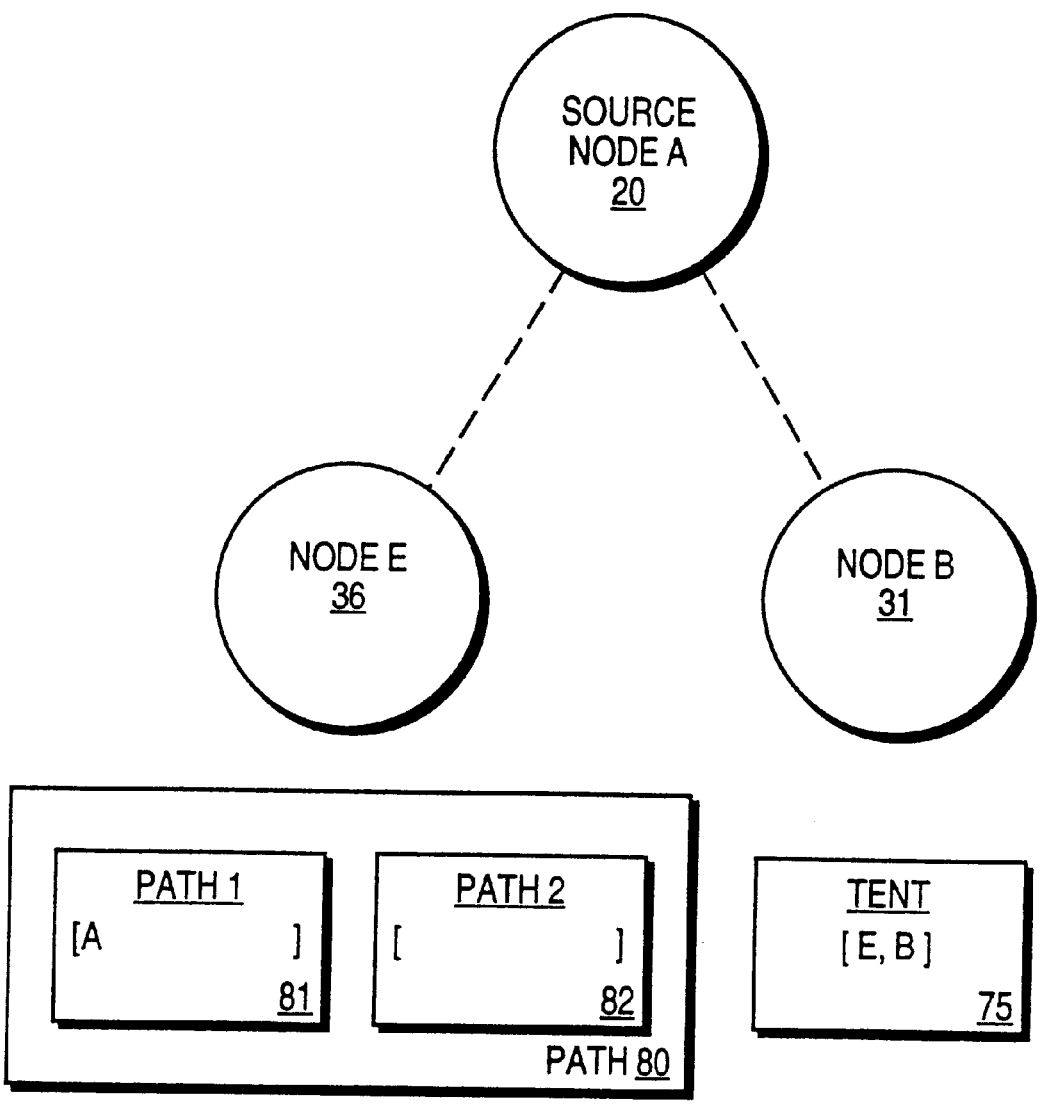
FIGS. 4A–4C illustrate an example of applying the Dijkstra algorithm to the network shown in FIG. 2.
Figure 4B:
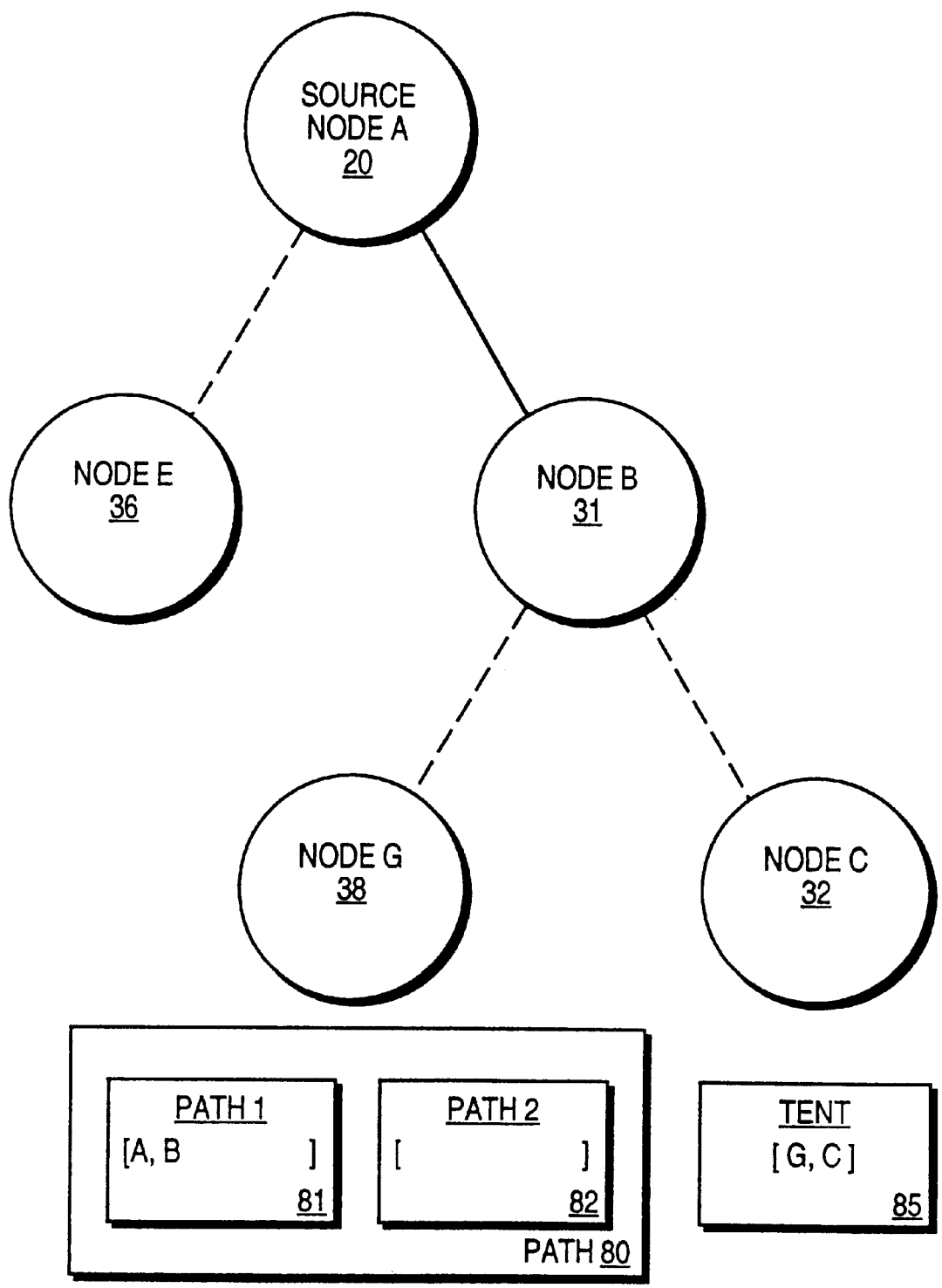
Figure 4C:
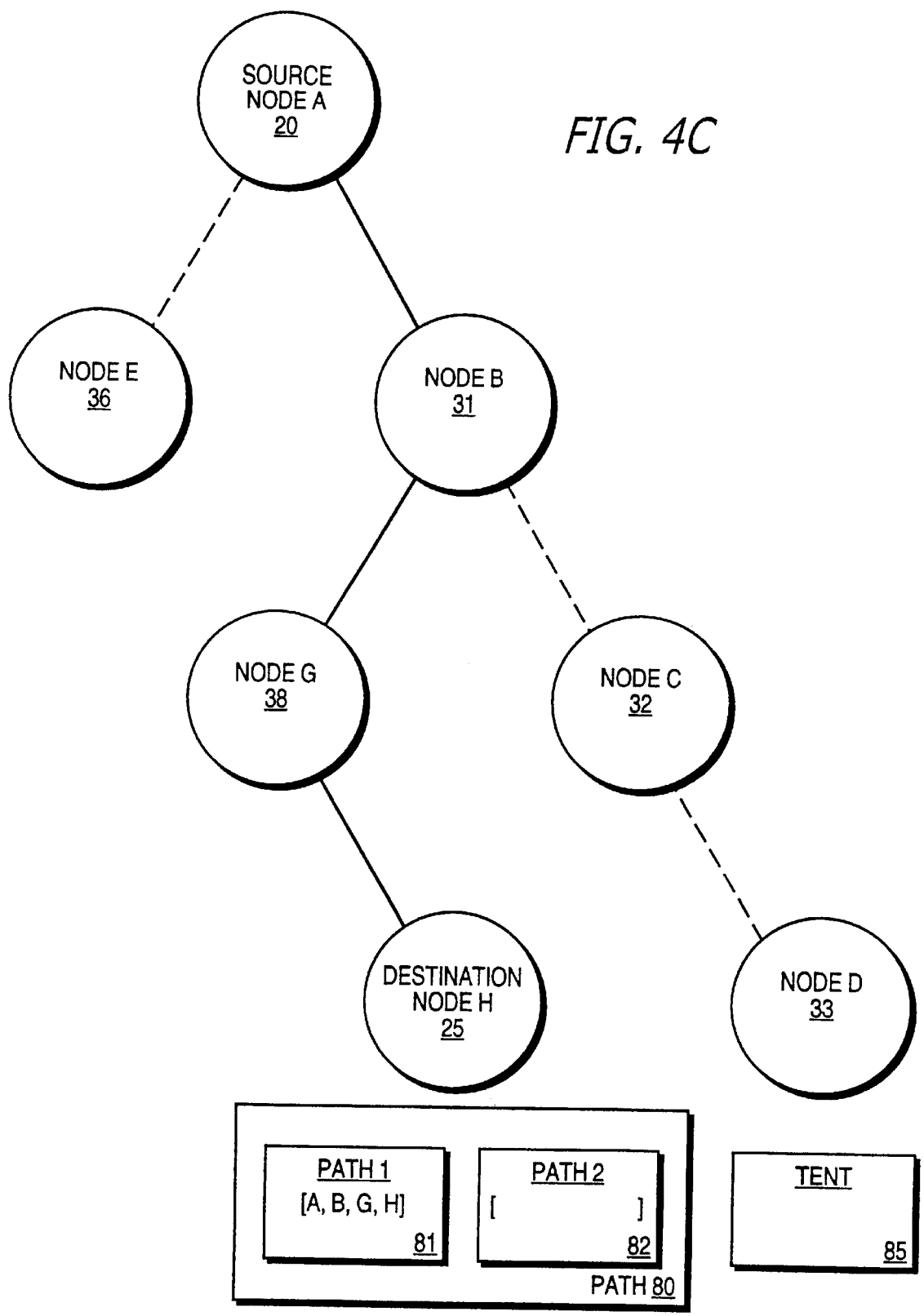

FIGS. 4A–4C illustrate an example of how the Dijkstra algorithm may be applied to network 10 of FIG. 2. In FIGS. 4A–4C, the Dijkstra algorithm is applied to determine a least cost path from source node A to destination node H in network 10. The process begins by placing the source node A in the path and expanding the graph from source node A, as shown in FIG. 4A. Accordingly, source node A is stored in PATHS database 80 as part of PATH 1, and the neighbor nodes E and B are stored in TENT database 75 as possible members of the least cost path to destination node H. The dashed lines between source node A and nodes B and E indicate that nodes B and E are only tentative, and not yet elements of the least cost path.

Referring to FIG. 4B, assume that node B is selected at random between node B and node E and is added to the PATHS database and the graph is expanded from node B. This random selection occurs when two or more adjacent nodes are of equal cost. When expanding node B, node C and node G are placed in the TENT database as possible members of the least cost path to destination node H. The process continues as shown in FIG. 4C by placing each node D and G into the path and expanding the node. FIG. 4C illustrates the shortest path from source node A to destination node H [A,B, G,H] via node B. Although another path may be found via node B, [A,B,C, D,H], the Dijkstra algorithm finds the least cost path, which, in this example is path [A,B,G,H] (assuming all path elements have equal cost).

Although not shown in FIGS. 4A–4C, the Dijkstra algorithm will also consider paths from source node A to destination node H via node E, by placing node E in the PATHS database and expanding the graph from node E. The shortest path from node A to node H via node E is [A,E,F, G,H], which is longer than path [A,B,G,H] found in FIG. 4C. Therefore, the Dijkstra algorithm will select path [A,B, G,H] as the least cost path from source node A to destination node H.

The present invention identifies non-overlapping paths from a source node to another node in the network (the destination node). A first path from the source to the destination is identified by using the Dijkstra algorithm discussed above. In the examples discussed herein, networks with non-directional links will be used to explain the present invention. Additionally, link metrics (e.g., the cost associated with a link) are not explicitly listed. However, those skilled in the art will appreciate that the present invention may be used with directional links as well as with links and nodes having specific associated metrics.

In the discussion below, it is assumed that there are no links directly from the source node to the destination node. If such a link exists, then the link itself may be considered a complete path from the source to the destination. Any direct links from the source to the destination are removed from consideration prior to executing the Dijkstra algorithm. Thus, the Dijkstra algorithm is used to find an additional path from the source node to the destination node without using any direct links. Next, the inventive procedure continues by finding one or more additional non-overlapping paths between the source node and the destination node without considering any direct links.

Figure 5:
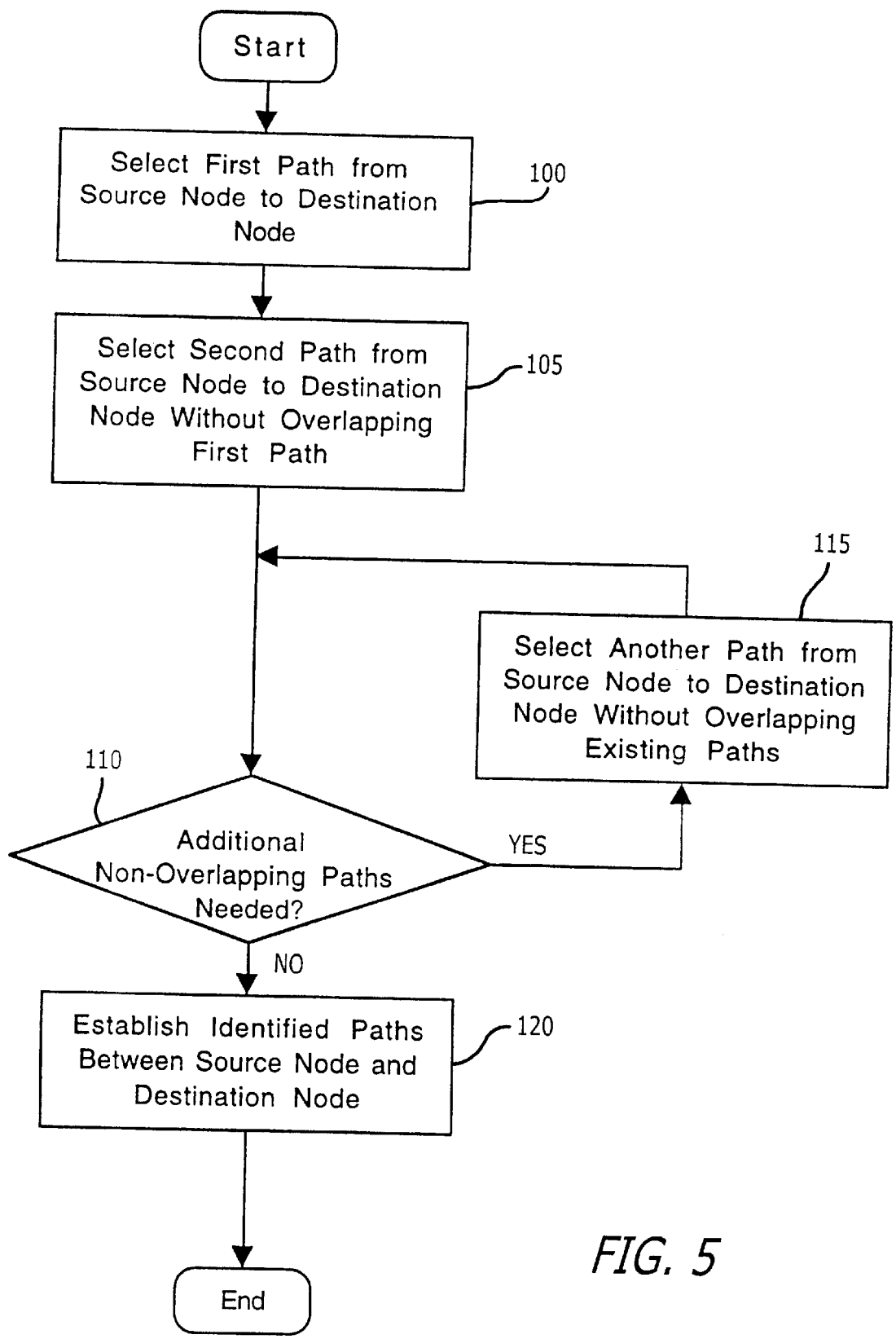
FIG. 5 shows an embodiment of a procedure for identifying multiple non-overlapping paths between a source node and a destination node in a network.

FIG. 5 illustrates a flow diagram of the overall procedure for identifying multiple non-overlapping paths between a source node and a destination node in a network. At step 100, the procedure selects a first path from the source node to the destination node using the Dijkstra algorithm discussed above. At step 105, a second path is selected using an algorithm referred to as a non-overlapping paths computation. The selection of a second path at step 105 may include rerouting a portion of the first path selected at step 100. The non-overlapping paths computation is discussed in greater detail below.

After identifying a second path between the source node and the destination node, step 110 determines whether additional non-overlapping paths are needed. This determination may be based on a specific number of non-overlapping paths requested by the user or network administrator. If an additional non-overlapping path is needed, then the routine branches to step 115 where the non-overlapping paths computation is performed again to identify a third non-overlapping path. The selection of an additional non-overlapping path at step 115 may include rerouting one or more of the previously identified paths. This process is repeated until the required number of non-overlapping paths have been identified. Although not shown in FIG. 5, if an additional non-overlapping path cannot be identified in step 105 or 115, then the procedure may select one or more minimally-overlapping paths. Alternatively, if additional non-overlapping paths cannot be found at step 105 or 115, the procedure may terminate and establish only the non-overlapping paths already selected.

When the required number of non-overlapping paths have been identified, step 120 of FIG. 5 establishes the identified paths between the source node and the destination node. At this point, the process terminates, having identified and established the requested number of non-overlapping paths.

The present invention may also be used to identify multiple non-overlapping paths between a source node to multiple destination nodes in the network. In this situation, the Dijkstra algorithm may be performed once to find the shortest path from the source node to each other node in the network. Next, the non-overlapping paths computation is performed repeatedly to identify non-overlapping paths to particular destination nodes in the network.

Referring to network 10 in FIG. 2, assume that two non-overlapping paths are desired between source node A and destination node H. For this example, assume that link 48 between node B and node G is expensive (i.e., the link has a high associated cost). The Dijkstra algorithm computes the shortest, or least cost, path from node A to node H. In this example, the Dijkstra algorithm identifies path [A,B,C,D,H] as the least cost path from node A to node H. The non-overlapping paths computations identifies a second path [A,E,F,G,H] as a non-overlapping path.

In another example, assume that all links and all nodes in the network of FIG. 2 have equal metrics (i.e., costs). In this situation, the Dijkstra algorithm will identify path [A,B,G,H] as the least cost path from node A to node H. By selecting [A,B,G,H] as the first path, all other paths between node A and node H overlap a portion of the first path. Therefore, it is necessary to "reroute" the first path to permit the identification of a second, non-overlapping path. The first path is rerouted such that the first portion of the path (the link from node A to node B) is used as the beginning of one new path [A,B,C,D,H], and the last part of the first path (the link from node G to node H) is used as the last part of another new path [A,E,F,G,H]. In this example, neither of the two established paths [A,B,C,D,H] and [A,E,F,G,H] are the least cost path from node A to node H, but they are non-overlapping.

Figure 6:
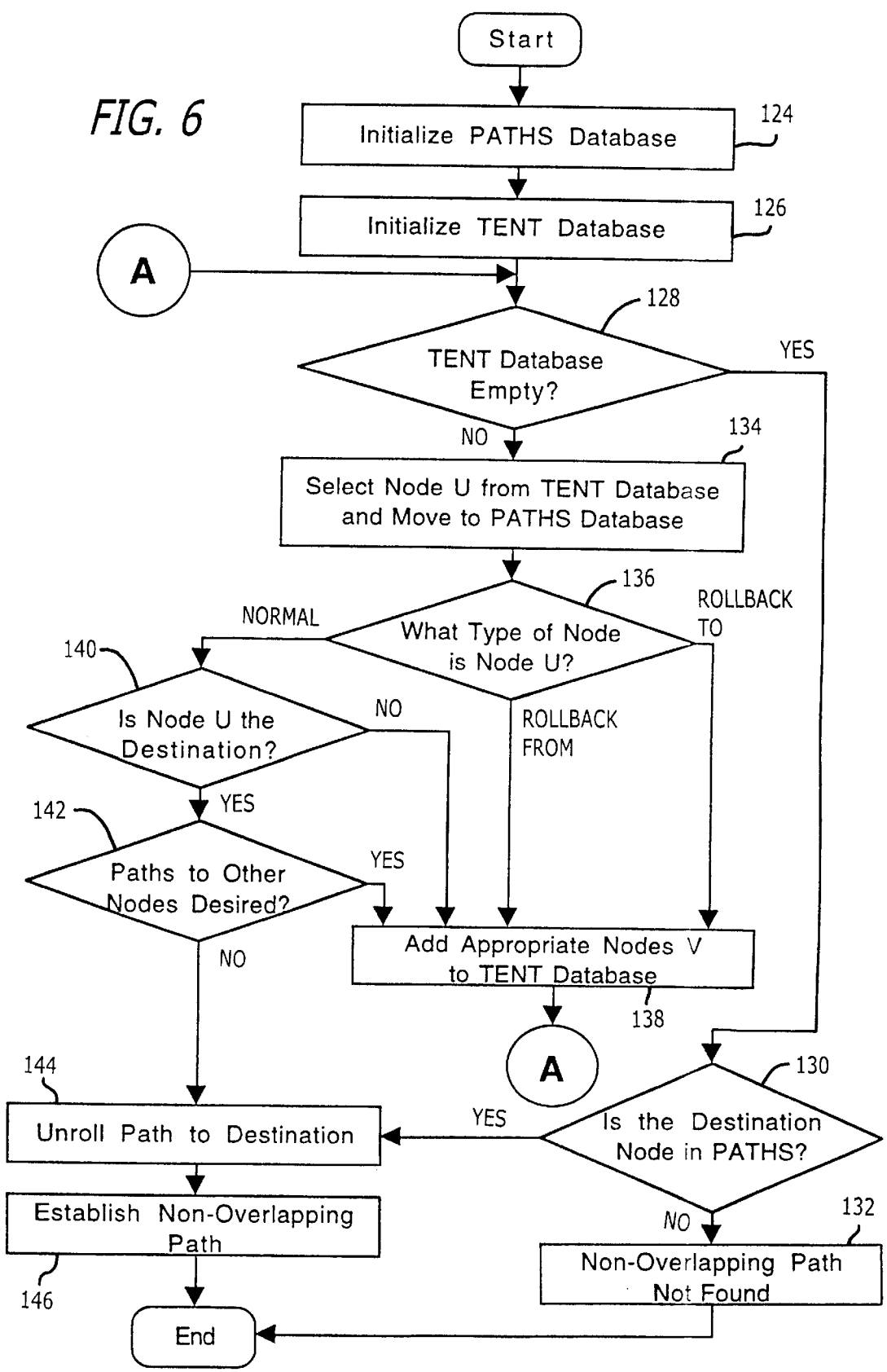
FIG. 6 shows an embodiment of a procedure for selecting an additional non-overlapping path.

FIG. 6, discussed below, is a flow diagram illustrating a procedure for selecting an additional non-overlapping path. This procedure includes two phases: searching for the path and unrolling the path. When performing this non-overlapping paths computation, the PATHS database contains a set of methods. Each method consists of a list of the network changes necessary to construct an additional non-overlapping path from the source node to another node. Each method includes any modifications necessary to the previously identified paths (e.g., the first path identified by the Dijkstra algorithm or any identified non-overlapping paths). Thus, each method may include changes to existing paths as well as the definition of a new path. When the non-overlapping paths computation terminates, then the PATHS database contains the method necessary to construct the minimum cost set of non-overlapping paths between the source node and the destination node.

When performing the non-overlapping paths computation, the TENT database contains a list of tentative methods that might later be added to the PATHS database. A method is included in the TENT database if it is the lowest cost method currently located from the source node to a particular node in the network. The method remains in the TENT database until the method has been confirmed as the lowest cost method. If a new, lower cost method is identified to a particular node, then the old method stored in TENT is replaced with the new, lower cost method. Methods in the TENT database are moved to the PATHS database when they are confirmed to be the lowest cost method to create a path from the source node to a particular node.

Three different types of nodes may appear in the TENT database and the PATHS database when performing the non-overlapping paths computation. The three types of nodes will be referred to as "normal" nodes, "rollback-from" nodes, and "rollback-to" nodes. Nodes that are not part of a previously identified path appear as "normal" nodes in TENT or PATHS. A normal node indicates that a method to create a path to the node has been identified. If the node is stored in TENT, then the method is the lowest cost method currently located to create a path to the node. If the node is stored in PATHS, then the method is the lowest cost method to create a path to the node. The destination node may appear as a normal node.

A node that is already part of an existing path and is neither the source node nor the destination node, can appear in TENT or PATHS as either a rollback-from node, a rollback-to node, or both a rollback-from node and a rollback-to node. If a node appears as a rollback-from node, then a method has been found to create a new path to the node, possibility replacing the part of the existing path up to that node, thereby releasing earlier nodes and links on the existing path. If a node appears as a rollback-to node, then a method has been found to use an alternate path from that node to some other node "downstream" from the node. This indicates that the rollback-to node and the existing path from the source node to the rollback-to node and up to, but not including, the associated rollback-from node can be released for use in another path.

Examples of rollback-from nodes and rollback-to nodes will be illustrated with reference to the network of FIG. 2. Assume that [A,B,G,H] is the first path identified by the Dijkstra algorithm. As discussed above, this path must be rerouted to allow the creation of a second non-overlapping path between source node A and destination node H. In this example, node G may be a rollback-from node, indicating that the first path will be rolled back (i.e., toward the source node) from node G. Similarly, node B may be a rollback-to node, indicating that the first path will be rolled back to node B. Thus, the first path [A,B,G,H] is rolled back from node G to node B, thereby releasing path segments [A,B] and [G,H] for use in other paths. The path between the rollback-from node (node G) and the rollback-to node (node B) is removed to allow the creation of new, non-overlapping paths. Once the path between node B and G is removed, two new non-overlapping paths [A,B,C,D,H] and [A,E,F,G,H] can be created.

Referring to FIG. 6, the non-overlapping paths computation begins at step 124 by initializing the PATHS database to be empty. Next, the TENT database is initialized at step 126 to include each node T in the network for which a link exists from the source node to node T and which is not already part of an existing path. Each node T in the TENT database has an associated method {S, T} and an indication that node T is a "normal" node.

At step 128 of FIG. 6, the procedure determines whether the TENT database is empty. Once a node is added to the TENT database, the TENT database will not become empty until that node has been added to the PATHS database or a better entry is added to the TENT database to replace the node. If TENT is empty, the procedure branches to step 130 to determine whether the destination node is in the PATHS database. If the destination node is not in PATHS, then a non-overlapping path was not found, and the procedure terminates. If step 130 determines that the destination node is in the PATHS database, then the procedure branches to step 144 to unroll the path to the destination. Additional details regarding the unrolling of paths are provided below. Step 146 then establishes a non-overlapping path to the destination.

If the TENT database is not empty at step 128, then the procedure continues to step 134 where a node U is selected from the TENT database and moved to the PATHS database. At step 136, the procedure determines the type of node selected in step 134 (node U). If node U is a rollback-from node or a rollback-to node, then the procedure continues to step 138 where appropriate nodes (e.g., nodes V adjacent to node U) are added to the TENT database. The procedure then returns to step 128.

If node U (selected at step 134) is a normal node, then the procedure branches from step 136 to step 140, which determines whether node U is the destination node. If node U is not the destination node, the procedure branches to step 138 where adjacent nodes V are added to the TENT database. If node U is the destination node, the procedure continues from step 140 to step 142 to determine whether additional paths to other nodes (e.g., other destination nodes) are desired. If paths to other nodes are desired, then the procedure branches to step 138 to add adjacent nodes V to the TENT database. Otherwise, the procedure continues from step 142 to step 144 where the path to the destination node is unrolled. Additional details are provided below regarding the unrolling of paths. Step 146 then establishes the non-overlapping path to the destination node.

The procedure illustrated in FIG. 6 identifies and establishes one non-overlapping path. However, the procedure may be repeated to find one or more additional non-overlapping paths.

The procedure described above with respect to FIG. 6 selects (at step 134) a node U stored in the TENT database and moves node U from the TENT database to the PATHS database, along with the associated method to create a path to node U. If node U is a normal node (and is the destination node), then the method to node U is added to the PATHS database. Adding the method to node U to PATHS indicates that the method provides a way to adjust existing paths and create a new additional non-overlapping path from the source node to node U.

If node U is not the destination node and node U is in the TENT database as a normal node (indicating that the node is not already included in an existing path), then node U is added to the PATHS database as a normal node. Additionally, the associated method to node U and the associated cost is added to the PATHS database. For each node V for which there is a link from node U to node V, the method from node S to U to V is compared with any existing methods to node V which are stored in the PATHS database or the TENT database. The cost of the new method to node V is the cost of the method from node S to node U, plus the cost, if any, to traverse node U, plus the cost of the method from node U to node V.

If node V is not on an existing path or if node V is the destination node, then node V may already be stored in TENT or PATHS as a normal node. If there is any existing method to node V stored in PATHS, then the new method will be ignored because the existing method is better (e.g., lower cost). Otherwise, if there is any existing method to node V stored in TENT, then the new method will be ignored if the existing method is better. However, if the new method to node V is better than any existing methods to node V stored in TENT or PATHS (or no methods exist to node V in either TENT or PATHS), then the method stored in TENT, if any, is removed from TENT and replaced with the new method to node V.

If node V is already on an existing path and is not the destination node, then node V might already be stored in TENT and/or PATHS as a rollback-from node, a rollback-to node, or both. If node V is already stored in PATHS (as either a rollback-from or rollback-to node) then the existing entry in PATHS will be better and, therefore, the new entry can be ignored. Otherwise, if node V is in TENT and the existing method to node V stored in TENT is of lower cost than the new method, then the existing method to node V in TENT is not changed. However, if node V is not already in PATHS and if the entry (or entries) in TENT are higher in cost than the new method to node V, then the existing entry as a rollback-from node, if any, is removed and the new method is added to TENT as a rollback-from node. Any existing rollback-to node entries are not changed or removed.

If node U is in TENT as a rollback-from node (implying that node U is already included in an existing path, but is not the source node or the destination node), then node U is added to PATHS as a rollback-from node. In this situation, a non-overlapping path cannot be found from node S to U to Z because node U is already on an existing path. However, one or more of the existing paths may be "rerouted."

The rerouting procedure begins by considering the possibility of replacing the old path via node U with a path which uses the newly found method to create a non-overlapping path up to node U in combination with the old path from node U to the destination. This replacement would free up the existing nodes on the first part of the previously found path (i.e., the portion nearest the source node) up to, but not including, node U. This implies that the associated nodes can be added to TENT as rollback-to nodes. For each node X which is on the previous path from the source node to node U, the procedure considers reaching node X by "splicing" the new path to node U onto the end of the previous path and using the first part of the previous path up to node X. This possibility is represented by adding node X to TENT as a rollback to node, with the associated method listed as the method from node S to U that was just moved from TENT to PATHS, plus a rollback-from U "marker." The associated cost is the cost of the method from node S to U minus the cost along the previous path from node X to U.

Specifically, if node U is moved from TENT to PATHS and node U is a rollback-from node (implying that node U is on an existing path and is neither the source node nor the destination node), then every node X which is on the same existing path as node U, but prior to node U and after the source node, is considered for adding to TENT as a rollback-to node. If node X is already in PATHS as a rollback-to node, then the existing entry is better than the new method and no further action is taken with respect to node X. If node X is not already in PATHS as a rollback-to node, then the new method is compared with any existing rollback-to entries in TENT. If an existing rollback-to entry is better than or equal in cost to the new method, then no changes are made regarding node X. Note, in this case existing rollback-from entries in TENT are ignored.

If there is no existing rollback-to entry, or if there is an existing rollback-to entry having a higher cost than the new method, then the existing entry, if any, is removed from TENT and the new method of rolling back to node X is added to TENT. If the new method is added to TENT as a rollback-to node (implying that it is better than the old rollback-to entry, if any), then it is also compared with any existing rollback-from entry in TENT. If the new rollback-to entry is better than the existing rollback-from entry, then the existing rollback-from entry is removed from TENT. If the existing rollback-from entry is better than the new rollback-to entry, then both entries are left in TENT.

The rollback-to entry must fully specify the method required to reach the rollback-to node. Thus, for each rollback-to entry, there is a specified rollback-from node specified as part of the method.

Since node X is on a previously located path prior to node U, node X cannot be the destination node. Thus, a rollback-to node can never be the destination node. If node U is a rollback-to node, then it must not be the destination node, and must already be on an existing path. In this situation, node U is added to PATHS as a rollback-to node along with the associated method to reach node U and the associated cost.

If node U is not the destination node and node U is in the TENT database as a rollback-to-node, then node U is added to the PATHS database as a rollback-to-node. Additionally, the associated method to node U and the associated cost is added to the PATHS database.

Next, each node V having a link from node U to V is considered such that node V either: 1) is the destination node, 2) is not on an existing path, 3) is on a different existing path than the path containing node U, or 4) is on the same existing path as contains node U, but after (i.e., towards the destination node) the rollback-from node associated with rollback-to node U. For each such node V, the method from node S to U to V is compared with the existing method, if any, to node V which may be stored in PATHS or TENT. The cost of the new method to V is the cost of the method from node S to U plus the cost, if any, to traverse node U, plus the cost of the link from node U to V. If there is an existing method to node V stored in PATHS and the existing method is better than the new method, then the new method is ignored. However, if the new method is better than any existing method in TENT, or if there was previously no method to node V in TENT, then the old method, if any, is removed from TENT and the new method is added to TENT. If node V is the destination node or if node V is not on any existing path, then node V is added to TENT as a normal node. If node V is on an existing path, and is not the destination node, then node V is added to TENT as a rollback-from node.

The algorithm terminates when TENT is empty. The non-overlapping paths computation terminates without finding an additional non-overlapping path if the TENT database is empty and the destination node was never added to TENT.

Figure 7:
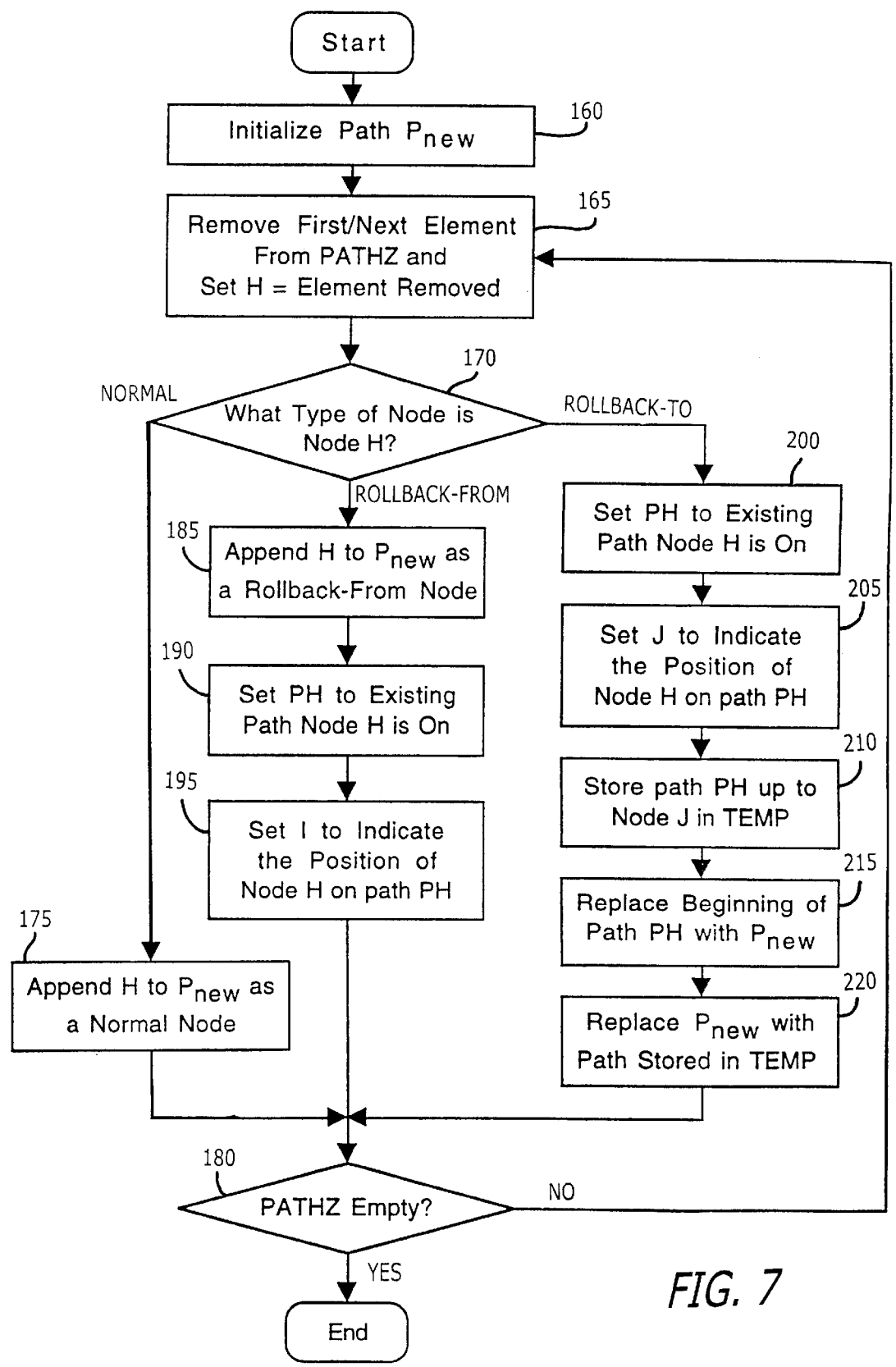
FIG. 7 shows a method for unrolling paths according to one embodiment of the invention.

FIG. 7 illustrates an embodiment of a procedure for unrolling paths (step 144 of FIG. 6). The unrolling procedure begins by creating a tentative new path $P_{new}$. $P_{new}$ is initialized at step 160 to contain only the starting node (referred to as node S). Next, the procedure examines the method PATHZ that is associated with the method to node Z stored in the PATHS database. Individually, elements of PATHZ are removed from PATHZ at step 165 and examined, starting with the beginning of the path. Each element removed from PATHZ is assigned to variable H. At step 170, the procedure determines the type of node associated with H (i.e., normal, rollback-from or rollback-to). If H is a normal node, the procedure branches to step 175 where H is appended to path $P_{new}$ as a normal node. From step 175, the procedure continues to step 180 to determine whether any elements remain in PATHZ. If PATHZ is empty, the procedure terminates with the new path stored in $P_{new}$ and the other paths rearranged (or rerouted) as necessary. If PATHZ is not empty at step 175, then the procedure returns to step 165 to remove the next element from PATHZ.

If node H is identified as a rollback-from node at step 170, then the procedure branches to step 185 where node H is appended to $P_{new}$ as a rollback-from node. At step 190, variable PH is set to identify the path on which node H is located. At step 195, the variable I is set to indicate the position of node H on path PH. The procedure then continues to step 180 to determine whether PATHZ is empty, as described above.

If node H is identified as a rollback-to node at step 170, then the procedure branches to step 200 where PH is set to identify the path on which node H is located. At step 205, J is set to indicate the position of node H on path PH. Variable J is similar to variable I discussed above, but J is associated with rollback-to nodes and I is associated with rollback-to nodes. Continuing to step 210, TEMP stores path PH up to and including the Jth node. Step 215 replaces the beginning of path PH with $P_{new}$, up to and including the Ith node. Next, step 220 replaces $P_{new}$ with the path stored in TEMP. The procedure then continues to step 180 to determine whether PATHZ is empty, as described above.

An example of the above "unrolling" procedure will be illustrated with reference to the network of FIG. 2. Suppose that the first path from source node A to destination node H is represented as [A,B,G,H]. Suppose that as part of the non-overlapping path computation, a new method to node G has been added to TENT consisting of the path [A,E,F,G]. Since node G is already on the first path, node G is entered in TENT as a rollback-from node. Suppose that node G has been selected as the entry to be removed from TENT and added to PATHS. In this situation, node G (when it is the selected node, as described below) will be moved from TENT to PATHS as a rollback-from node. At this point, nodes previous to node G on the old path (i.e., nodes A and B) may be added to TENT as rollback-to nodes. Thus, node B is added to TENT with the notation that the path to node B consists of: <re-route the first path by splicing the new path to G onto the end of the first path>, <use the first part of the first path up to node B as the new method to get to node B>. The cost associated with this method is the change of the cost of the first path (i.e., the cost of the path [A,E,F,G] minus the cost of the path [A,B,G]) plus the cost to get from node A to node B along the first part of the first path.

The above procedure results in the addition of node B to TENT as a rollback-to node. At a later point in the algorithm, node B will be moved from TENT to PATHS. At this point, nodes which are adjacent to node B (but not on the old path) may be added to TENT as normal or rollback-from nodes. However, node G cannot be added to TENT at this point due to the expanding of node B. This specifically implies that node C will be added to TENT as a normal node. The procedure then continues in the normal manner and finds the path from node B to C to D to H.

Figure 8:
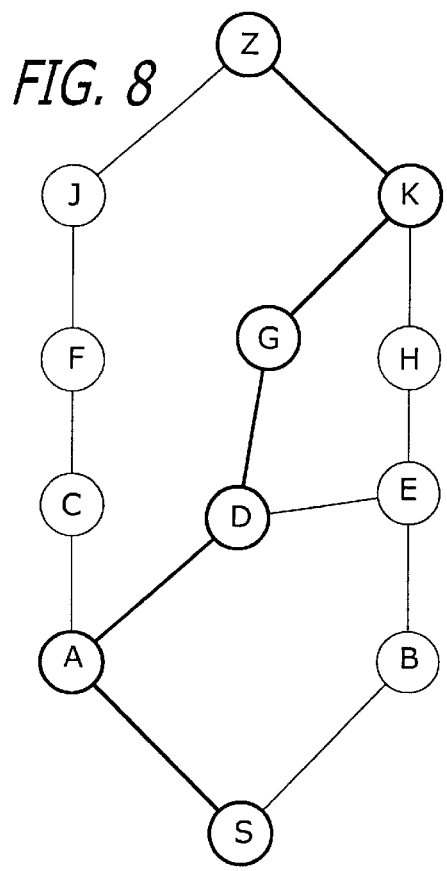
FIG. 8 illustrates an exemplary network having a source node, a destination node, and multiple intermediate nodes.

FIG. 8 illustrates an exemplary network having a source node S, a destination node Z, and various nodes A–K coupled between nodes S and Z. When adding a potential rollback-to node to TENT, it is possible that the node may already be in TENT as a rollback-from and/or a rollback-to node. This situation will be illustrated with reference to FIG. 8. In the network of FIG. 8, an existing path [S,A,D,G,K,Z] has already been located between the source and destination nodes. In this example, it is possible to splice either path [S,B,E,D] or path [S,B,E,H,K] as the replacement first part of the existing path. Selection of the replacement path depends on where it is desired to continue from the existing path and which replacement path represents the minimum additional cost to the existing path. For example, it is clear by observation of FIG. 8 that we will want a second path [S,A,C,F,J, Z]. This will be possible because the algorithm will discover that it can rollback either from node D to node A (resulting in a path [S,B,E,D,G,K,Z]) or from node K to node A (resulting in path [S,B,E,H,K,Z]). The preferred path depends on which path results in the lowest possible additional cost.

Figure 9:
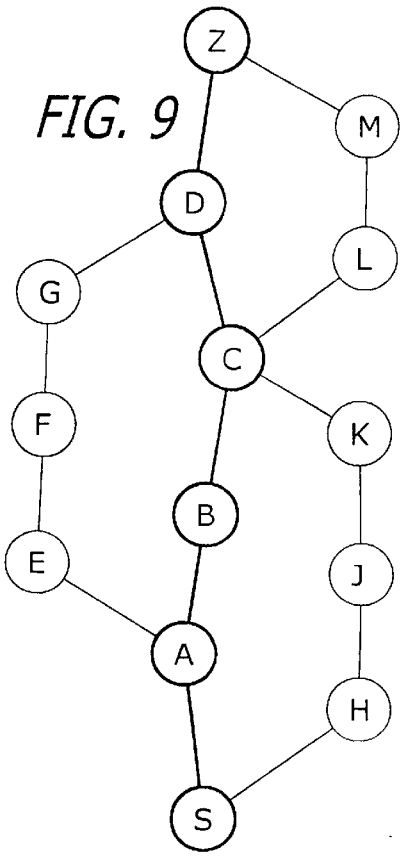
FIGS. 9 and 10 illustrate additional network configurations having a source node, a destination node, and multiple intermediate nodes.

FIG. 9 illustrates another exemplary network configuration. In the example of FIG. 9, a first path [S,A,B,C,D,Z) is located using the Dijkstra algorithm. The non-overlapping paths computation is then used to find a second path. To initiate the algorithm, node H (the only node which is adjacent the source node S and not on an existing path) is added to the TENT database as a normal node. Node H is then moved from TENT to PATHS and node J is added to TENT as a normal node. Next, node J is moved from TENT to PATHS and node K is added to the TENT database as a normal node. Node K is then moved from TENT to PATHS and node C is added to TENT as a rollback-from node. At this point, the method associated with node C's entry in TENT may be written as [H,J,K,C—rollback-from].

The next step moves node C from TENT to PATHS. However, since node C is a rollback-from node, node C is on an existing path (i.e., path [S,A, B,C,D,Z]) and an alternate method has been found to create a path from node S to node C. This allows earlier nodes on the existing path (i.e., nodes A and B) to be released for use by alternate paths. However, this does not allow node C itself to be released. When node C is moved from TENT to PATHS, nodes A and B can be added to TENT as rollback-to nodes, but node L cannot be added to TENT at this time because a method has not yet been found to create a non-overlapping path to node L, even if the existing path is rerouted prior to node C. The method associated with the node B entry in TENT may be written as [H,J,K,C—rollback-from, B—rollback-to]. Similarly, the method associated with the node A entry in TENT may be written as [H,J,K, C—rollback-from, A—rollback-to].

When node B is moved from TENT to PATHS, no additional nodes may be placed in TENT because node B does not have any links to other nodes which meet the criteria specified in the algorithm (i.e., an adjacent node not already on the same existing path that is being rolled back). When node A is moved from TENT to PATHS, node E may be placed in TENT as a normal node. Node E is then moved from TENT to PATHS and nodes F and G are first placed in TENT and then in PATHS as normal nodes. Next, node D is placed in TENT as a rollback-from node. The method associated with node D's entry in TENT may be written as [H,J,K,C—rollback-from, A—rollback-to, E,F,G,D—rollback-from].

Node D is then moved from TENT to PATHS. At this point, node C can be added to TENT as a rollback-to node. Note that it is permissible to add node C as a rollback-to node even though node C is already listed in PATHS as a rollback-from node. The ability to rollback to node C allows links from node C to other unused nodes (e.g., node L) to be used. The method associated with the rollback-to entry for node C in TENT (and later in PATHS) is [H,J,K,C—rollback-from, A—rollback-to, E,F,G,D—rollback-from, C—rollback-to]. Next, node C is moved from TENT to PATHS as a rollback-to node with the associated method. At this point, node L may be added to TENT as a normal node. Subsequently, nodes M and Z are added to TENT and moved to PATHS as normal nodes. The algorithm terminates when node Z is added to PATHS with the associated method [H,J,K,C—rollback-from, A—rollback-to, E,F,G,D—rollback-from, C—rollback-to, L,M,Z].

As discussed above, FIG. 7 illustrates a procedure for "unrolling" paths. This unrolling procedure will be illustrated by way of example using the method identified above with respect to FIG. 9. The unrolling procedure will be used to create two non-overlapping paths from one existing path. Initially, PATHZ is set to be the method associated with node Z; i.e., [H,J,K, C—rollback-from, A—rollback-to, E,F,G, D—rollback-from, C—rollback-to, L,M,Z]. During the first three unrolling steps, the first three elements of PATHZ are individually removed from PATHZ and appended to the new path $P_{new}$. After the first three elements of PATHZ are appended to $P_{new}$, the paths are as follows:

PATHZ=[C—rollback-from, A—rollback-to, E,F,G,D—rollback-from, C—rollback-to, L,M,Z]

$P_{new}$=S,H,J,K

P1=[S,A,B,C,D,Z]

Note that P1 indicates the original (i.e., existing) value of the path P1. This path will change during the path unrolling procedure In the fourth unrolling step, the element "C—rollback-from" is removed from PATHZ and node C is appended to $P_{new}$. Since node C is already in path P1, PH is set to identify path P1. Since node C is the fourth node on path P1, the value of variable I is set to 4. After the fourth unrolling step, the paths are:

PATHZ=[A—rollback-to, E,F,G,D—rollback-from, C—rollback-to, L, M,Z]

$P_{new}$=S,H,J,K,C

P1=[S,A,B,C,D,Z]

PH=P1

I=4

In the fifth unrolling step, the element "A—rollback-to" is removed from PATHZ. Since node A is the second element of path P1, variable J is set to the value 2. The portion of path P1 up to and including the second node (J=2) is stored in TEMP. Thus, TEMP is set to [S,A]. Next the beginning of path P1, up to and including the fourth node (I=4), is replaced with the path in P1. Finally, path $P_{new}$ is replaced with the path stored in TEMP. Thus, after the fifth unrolling step the paths are as follows:

PATHZ=[E,F,G,D—rollback-from, C—rollback-to, L,M, Z]

$P_{new}$=[S,A]

P1=[S,H,J,K,C,D,Z]

The next three iterations of the algorithm remove nodes E,F, and G from PATHZ and adds them to path $P_{new}$, resulting in the following paths:

PATHZ=D—rollback-from, C—rollback-to, L,M,Z]

$P_{new}$=[S,A,E,F,G]

P1=[S,H,J,K,C,D,Z]

The next iteration of the algorithm removes element "D—rollback-from" from PATHZ and node D is added to $P_{new}$. Since node D is the sixth node on path P1, variable I=6. The paths are as follows:

PATHZ=[C—rollback-to, L,M,Z]

$P_{new}$=[S,A,E,F,G,D]

P1=[S,H,J,K,C,D,Z]

PH=P1

I=6

The next iteration removes element "C—rollback-to" from PATHZ. Since node C is the fifth node in path P1, variable J=5. TEMP is set to [S,H,J, K,C], the first five elements in path P1. The beginning of path P1, up to and including node C, is replaced with $P_{new}$ and $P_{new}$ is set to the value stored in TEMP. After these changes, the paths are as follows:

PATHZ=[L,M,Z]

$P_{new}$=[S,H,J,K,C]

P1=[S,A,E,F,G,D,Z]

Finally, the last three iterations move nodes L, M, and Z from PATHZ to $P_{new}$, resulting in the following paths:

PATHZ=[ ]

$P_{new}$=[S,H,J,K,C,L,M,Z]

P1=[S,A,E,F,G,D,Z]

At this point, PATHZ is empty and the unrolling procedure terminates. Path P1 has been rerouted to permit the establishment of a new, non-overlapping path specified by $P_{new}$.

For efficiency reasons, it is desirable to move nodes from TENT to PATHS in a "monotonic" manner such that once a node is added to the PATHS database, it will never be removed from PATHS and placed back onto the TENT database. Always moving the node with the lowest total cost from TENT to PATHS is not an efficient method for performing the non-overlapping paths computation because "rollback-to" nodes have a lower metric value than the node that the rollback is from. One solution allows paths to be removed from the PATHS database and returned to the TENT database if a better alternative is identified. Although this solution may produce an accurate result, it may add significantly to the overall computational cost of the non-overlapping paths computation.

Another solution provides a method which ensures that after a node is moved from TENT to PATHS during the non-overlapping paths computation, the node will never need to be removed from PATHS and returned to TENT. This method ensures that the computational cost of the non-overlapping paths computation is similar to the cost of the normal Dijkstra computation. This method computes a function which can be applied to a node such that expanding the node (i.e., the computation associated with moving the node from TENT to PATHS) will never result in a lower function value for subsequent nodes which are added to TENT.

The function is the difference between the "existing path restricted" cost (EPR cost) of getting to a particular node given the previous set of existing paths, and the cost of getting to the particular node given the method specified by the entry in TENT. Suppose that at the beginning of the non-overlapping paths computation there are m existing paths between the source node and the destination node. For nodes which are already on one of the existing paths, compute the EPR cost to the node from the source node using the existing path that the node is on. For nodes which are on an existing path, their EPR cost is calculated by restricting them to only follow the existing path (other potential paths which do not follow the existing path are not considered). For nodes which are not on an existing path, compute the cost to each other node, either from the nodes on an existing path (but constrained to reach those nodes via the existing path), or from other nodes which are not on any existing path.

During the initial execution of the non-overlapping paths computation (where only one existing path has been located), the EPR computation uses the path found via the Dijkstra computation and computes one additional path. For this initial execution, the cost to reach each node as calculated by the Dijkstra computation are identical to the cost calculated by the EPR computation. Thus, for the initial execution of the non-overlapping paths computation, the EPR computation may be skipped. However, the EPR computation is required for all subsequent executions of the non-overlapping paths computation.

Figure 10:
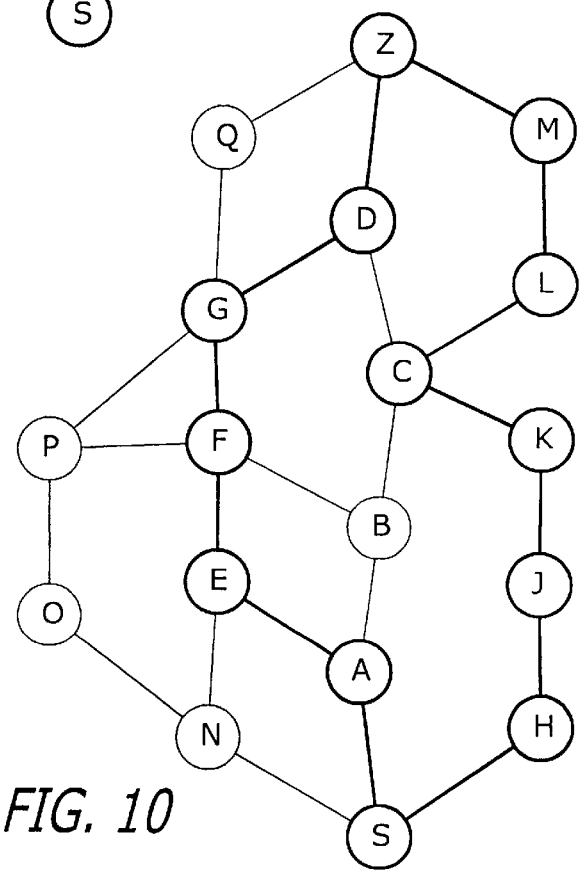

An example of the EPR computation will be illustrated with reference to FIG. 10, illustrating an example network with two existing paths between source node S and destination node Z. The existing paths are defined as:

P1=[S,A,E,F,G,D,Z] and
P2=[S,H,J,K,C,L,M,Z]

The non-overlapping paths computation will be used to attempt to locate a third non-overlapping path between the source node S and the destination node Z. Prior to performing the non-overlapping paths computation, the EPR cost is computed to reach each node in the network from the source node, given the two existing paths P1 and P2.

For the purpose of determining the cost to reach the nodes on path P1, only path P1 itself may be used. Thus, in the network of FIG. 10, the EPR cost to node A is the cost of the link from node S to node A. Similarly, the EPR cost to node E is the cost of the link from node S to node A plus the cost, if any, to traverse node A, plus the cost of the link from node A to node E. The costs to nodes F, G, D, and Z are calculated in a similar manner. Similarly, the EPR cost from the source node to any node which is on path P2 must use the path P2 itself.

For nodes which are not on an existing path (e.g., nodes B,N,O,P, and Q in FIG. 10), the EPR cost computation to reach the node may use any path, except that if the path ever reaches an existing path, it must use the existing path from that point back to the source node. For example, the best path to nodes N,O, and P might use the path [S,N,O,P] which does not cross an existing path. However, the best path to node Q might use a path including node G. Since node G is on path P1, the EPR cost to reach node Q via node G must use the path from source node S to node G. Thus, the EPR cost to node G uses the path [S,A,E,F,G Q].

The EPR cost to a particular node which is on an existing path is the cost to the previous node on the path plus the cost, if any, to traverse the previous node, plus the cost of the link from the previous node to the particular node. Additionally, the EPR cost to any other node X is the minimum, over all neighbor nodes Y, of the cost to node Y plus the cost to traverse node Y plus the cost of the link from node X to node Y.

Given the EPR cost to each node, the non-overlapping paths computation determines which node to move from TENT to PATHS using the procedures discussed above. This non-overlapping paths computation considers each node in the TENT database. The cost of the method which is stored in TENT to reach node U is compared with the EPR cost to reach node U and the difference is computed as:

Delta(U)=(cost of method to reach node U stored in TENT)−(EPR cost to reach node U)

After considering all methods in TENT, the method having the lowest Delta(U) is selected to be moved from TENT to PATHS. If two or more methods have the same lowest Delta(U), then any one of the lowest Delta(U) nodes may be selected.

One way to characterize the non-overlapping paths computation described above is that intersecting nodes are assigned an infinite cost such that they can never be included in the best path. For certain network topologies, non-overlapping paths cannot be achieved. In these situations, it may be desirable to provide minimal overlap between paths. This may be achieved, for example, by merely increasing the cost associated with a path element already included in an existing path such that inclusion in a subsequent path is permitted, but discouraged.

When overlap is allowable, it may be desirable to assign different costs to overlapped links than to intersecting nodes. For example, a node may be more likely to fail than a link, or vice versa, and the amount of increased cost due to overlap or intersection should be made in view of the respective likelihood of failure. In any event, the increase in cost assigned to overlapping links and intersecting nodes determines whether minimal overlap or minimal intersection is the primary factor in establishing a virtual circuit.

As described above, various links or paths between nodes may be bidirectional. However, the invention described herein may also be used with one or more unidirectional links or paths.

Embodiments of the algorithm and procedures discussed above can be used to identify paths between multiple sources and a destination. In this situation, a new false node is used as the source for purposes of executing the algorithm and procedures discussed above. A unidirectional link is established from the false source to each of the multiple sources. The procedures discussed above are then used to identify minimally-overlapping or non-overlapping paths.

Embodiments of the invention can also be used to identify paths between a source and multiple destinations. In this situation, a new false node is used as the destination for purposes of executing the algorithm and procedures discussed above. A unidirectional link is established from each of the multiple destinations to the false destination. The procedures discussed above are then used to identify minimally-overlapping or non-overlapping paths.

Other embodiments of the invention can be used to identify paths between multiple sources and a destination, in which the multiple sources are prioritized. In this situation, a new false node is used as the source for purposes of executing the algorithm and procedures discussed above. First, a unidirectional link is established from the new false source to the highest priority source. The procedure then determines whether an additional path can be established. If not, then a unidirectional link is established from the new false source to the next highest priority source and the procedure then determines whether an additional path can be established. This process continues until a path is established.

The invention described herein may also be used to identify paths between multiple sources and multiple destinations. In this case, a false source node is provided and a unidirectional link is established from the false source node to each of the multiple sources. Additionally, a false destination node is provided and a unidirectional link is established from each of the multiple destinations to the false destination node. The above procedures are then used to identify minimally-overlapping or non-overlapping paths.

In alternative embodiments, the present invention may be applicable to implementations of the invention in integrated circuits or chip sets, wireless implementations, switching systems products and transmission systems products. For purposes of this application, the term switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the invention as defined by the appended claims in view of their full scope of equivalence.

What is claimed is:

1. A method for determining a plurality of minimally-overlapping paths between a source node and a destination node in a network, the method comprising:
   (a) determining a first path between the source node and the destination node, the first path determined to be the least cost path to the destination node;
   (b) determining a second path minimally overlapping the first path between the source node and the destination node in view of costs, wherein both the first and the second path contain nodes and links having a cost assigned to the nodes and links, respectively, and at least one node is in communication with other nodes of the network to exchange link state data packets and at least one node includes a topology of the network for determining the first and second paths and stores tentative paths to other nodes and confirmed least cost paths to other nodes; and
   (c) if the first path and the second path overlap, then:
   (d) selecting an intersecting node of the first path and the second path, and
   (e) rolling back from the selected intersecting node to a non-intersecting node and modifying at least one path to minimize the overlap between the first path and the second path.

2. The method of claim 1, wherein a greater cost is assigned to overlapping links than to intersecting nodes.

3. The method of claim 1, wherein a greater cost is assigned to intersecting nodes than to overlapping links.

4. The method of claim 1, further including:
   establishing a first circuit between the source node and the destination node along the first path; and
   establishing a second circuit between the source node and the destination node along the second path.

5. The method of claim 4, wherein the network is an asynchronous transfer mode (ATM) network and the first and second circuits are switched virtual circuits (SVCs).

6. The method of claim 4, wherein the network is an asynchronous transfer mode (ATM) network and the first and second circuits are permanent virtual circuits (PVCs).

7. The method of claim 1 wherein the method is implemented using a switching system product.

8. The method of claim 1 wherein the method is implemented using a transmission system product.

9. The method of claim 1, wherein acts (d) and (e) are repeated if the first path and the second path overlap until the overlap between the first path and the second path is minimized.

10. A method for determining a plurality of minimally overlapping paths between a source node and a destination node in a network, the method comprising:
   determining a first path between the source node and the destination node, the first path determined by a Dijkstra algorithm to be the least cost path between the source node and the destination node;
   determining a second path minimally overlapping the first path between the source node and the destination node in view of costs, wherein both the first and the second path contain nodes and links having a cost assigned to the nodes and links, respectively, and at least one node is in communication with other nodes of the network to exchange link state data packets and at least one node includes a topology of the network for determining the first and second paths and stores tentative paths to other nodes and confirmed least cost paths to other nodes; and if the first path and the second path overlap, then:
(a) selecting an intersecting node of the first path and the second path, and
(b) rolling back from the selected intersecting node to a non-intersecting node and modifying at least one path to minimize the overlap between the first path and the second path.

11. The method of claim 10, wherein a greater cost is assigned to overlapping links than to intersecting nodes.

12. The method of claim 10, wherein a greater cost is assigned to intersecting nodes than to overlapping links.

13. The method of claim 10, wherein determining the first path comprises:
selecting a first neighbor node of the source node for inclusion in the first path; and
selecting a neighbor node for each previously selected node of the first path for inclusion in the first path until the destination node is included in the first path.

14. The method of claim 10, further including:
establishing a first circuit between the source and destination nodes along the first path; and
establishing a second circuit between the source and destination nodes along the second path.

15. The method of claim 14, wherein the network is an asynchronous transfer mode (ATM) network and the first and second circuits are switched virtual circuits (SVCs).

16. The method of claim 14, wherein the network is an asynchronous transfer mode (ATM) network and the first and second circuits are permanent virtual circuits (PVCs).

17. The method of claim 10 wherein the method is implemented using a switching system product.

18. The method of claim 10 wherein the method is implemented using a transmission system product.

19. The method of claim 10, wherein acts (a) and (b) are repeated if the first path and the second path overlap until the overlap between the first path and the second path is minimized.

20. A method for determining a plurality of minimally overlapping paths between a source node and a destination node in a network, the method comprising:
determining a first path between the source node and the destination node, the first path determined to be the least cost path between the source node and the destination node;
determining a second path minimally overlapping the first path between the source node and the destination node in view of costs, wherein both the first and the second path contain nodes and links having a cost assigned to the nodes and links, respectively, and at least one node is in communication with other nodes of the network to exchange link state data packets and at least one node includes a topology of the network for determining the first and second paths and stores tentative paths to other nodes and confirmed least cost paths to other nodes; and
if the first path and the second path converge at an intersecting node,
splicing a portion of the second path from the source node to the intersecting node with a portion of the first path from the intersecting node to form a new first path, and
using a portion of the first path from the source node to a third node prior to the intersecting node, determining a new second path.

21. The method of claim 20, wherein determining the first path comprises:

selecting a first neighbor node of the source node for inclusion in the first path; and
selecting a neighbor node for each previously selected node of the first path for inclusion in the first path until the destination node is included in the first path.

22. The method of claim 21, wherein the selection of neighbor nodes is performed in view of a set of one or more metrics that specify a cost for each neighbor node such that the first path is a lowest cost path.

23. The method of claim 21, wherein determining the second path comprises:
selecting a second neighbor node of the source node for inclusion in the second path; and
selecting a neighbor node of each previously selected node of the second path for inclusion in the second path until the intersecting node or the destination node is included in the second path.

24. The method of claim 23, wherein the selection of neighbor nodes is performed in view of a set of one or more metrics that specify a cost for each neighbor node such that the second path has a low cost.

25. The method of claim 23, wherein determining the new second path comprises:
selecting a neighbor node of the third node for inclusion in the new second path; and
selecting a neighbor node of each previously selected node of the new second path for inclusion in the new second path until an intersecting node of the new first path or the destination node is included in the new second path.

26. A switching system comprising:
a plurality of switches including a plurality of ports; and
wherein the switching system through the exchange of data between the ports of the switches,
(i) determines a first path between a source switch to a destination switch calculated to be the least cost path,
(ii) determines a second path minimally overlapping the first path between the source switch and the destination switch in view of costs, wherein both the first and the second path contain switches and links having a cost assigned to the switches and links, respectively, and at least one switch is in communication with other switches of the network to exchange link state data packets and each switch includes a topology of the network for determining the first and second paths and stores tentative paths to other switches and confirmed least cost paths to other switches, and
(iii) if the first path and the second path overlap, then:
selecting an intersecting switch of the first path and the second path, and
rolling back from the intersecting switch to a non-intersecting switch and modifying at least one path to minimize the overlap between the first path and the second path.

27. The switching system of claim 26, wherein each switch includes a switching engine to perform switching functions for exchanging the data between the ports.

28. The switching system of claim 27, wherein the switching engine includes a processor and a memory.

29. The switching system of claim 28, wherein the switching engine further includes software stored in the memory for determining the first path, the second path, and for modifying at least one path to minimize the overlap of the paths.

30. A switching system comprising:

a plurality switches including a plurality of ports; and a switching engine to exchange data between the ports of the switches to:
- (i) determine a first path to between a source switch to a destination switch calculated to be the least cost path, and
- (ii) determine a second path minimally overlapping the first path between the source switch and the destination switch in view of costs, wherein both the first and the second path contain switches and links having a cost assigned to the switches and links, respectively, and at least one switch is in communication with other switches of the network to exchange link state data packets and each switch includes a topology of the network for determining the first and second paths and stores tentative paths to other switches and confirmed least cost paths to other switches, and
- (iii) if the first path and the second path overlap, then:
  - selecting an intersecting switch of the first path and the second path, and
  - rolling back from the intersecting switch to a non-intersecting switch and modifying at least one path to minimize the overlap between the first path and the second path.

31. The switching system of claim 30, wherein the switching engine includes a processor and a memory.

32. The switching system of claim 31, wherein the switching engine further includes software stored in the memory for determining the first path, the second path, and for modifying at least one path to minimize the overlap of the paths.

33. A node for use in a network, the network having a plurality of other nodes including a destination node, the node comprising:

at least one port;

a link state database configured to receive and store link state data packets from other nodes of the network routed through the at least one port, each link state data packet including an identification of neighbor nodes and costs associated with reaching the neighbor nodes, the link state database to store a topology of the network; and an engine coupled to the link state database and the at least one port, the engine configured to exchange data and to use the link state database to determine a first least cost path to the destination node and a second minimally overlapping path to the destination node;

wherein the node through the exchange of data between the ports of the other nodes,
- (i) determines a first path between a source node to the destination node calculated to be the least cost path,
- (ii) determines a second path minimally overlapping the first path between the source node and the destination node in view of costs, wherein both the first and the second path contain nodes and links having a cost assigned to the nodes and links, respectively, and the node is in communication with other nodes of the network to exchange the link state data packets and the node includes a topology of the network for determining the first and second paths and stores tentative paths to other nodes and confirmed least cost paths to other nodes, and
- (iii) if the first path and the second path overlap, then:
  - selects an intersecting node of the first path and the second path, and
  - rolls back from the intersecting nodes to a non-intersecting node and modifies at least one path to minimize the overlap between the first path and the second path.

34. The node of claim 33, wherein the second minimally overlapping path is determined in view of costs.

35. The node of claim 33, further comprising a TENT database coupled to the engine and configured to store tentative paths to other nodes in the network.

36. The node of claim 33, further comprising a PATHS database coupled to the engine and configured to store least cost paths to other nodes in the network.

37. The node of claim 33, further comprising a FORWARDING database coupled to the engine and configured to store a best path to the destination node.

38. The node of claim 33, wherein the engine includes a processor and a memory.

39. The node of claim 38, wherein the engine further includes software stored in the memory for determining the first least cost path and the second minimally overlapping path.

40. The node of claim 33, wherein the node is a router.

41. The node of claim 33, wherein the node is a switch.

42. The node of claim 33, wherein the node is an Asynchronous Transfer Mode (ATM) switch.

* * * * *